United States Patent
Kaneuchi

(10) Patent No.: US 12,304,390 B2
(45) Date of Patent: May 20, 2025

(54) ELECTRONIC INNER MIRROR DEVICE, NOTIFICATION CONTROL METHOD THEREFOR, AND NOTIFICATION CONTROL PROGRAM THEREFOR

(71) Applicant: TOYOTA JIDOSHA KABUSHIKI KAISHA, Toyota (JP)

(72) Inventor: Naoki Kaneuchi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 270 days.

(21) Appl. No.: 18/143,904

(22) Filed: May 5, 2023

(65) Prior Publication Data

US 2023/0398935 A1 Dec. 14, 2023

(30) Foreign Application Priority Data

May 20, 2022 (JP) .................. 2022-083328

(51) Int. Cl.
*B60S 1/58* (2006.01)
*B60R 1/04* (2006.01)
*B60R 1/12* (2006.01)
*B60R 1/26* (2022.01)
(Continued)

(52) U.S. Cl.
CPC ............. *B60R 1/12* (2013.01); *B60R 1/26* (2022.01); *B60S 1/54* (2013.01); *B60S 1/583* (2013.01); *G02F 1/137* (2013.01); *B60R 1/04* (2013.01); *B60R 2001/1215* (2013.01)

(58) Field of Classification Search
CPC .... B60R 1/12; B60R 1/26; B60R 1/04; B60R 2001/1215; B60R 2300/20; B60R 2300/8046; B60S 1/54; B60S 1/583; B60S 1/566; B60S 1/0818; B60S 1/56; B60S 1/46; G02F 1/137; B60Q 9/00
See application file for complete search history.

(56) References Cited

U.S. PATENT DOCUMENTS 11,194,324 B2    12/2021  Kida et al.
2015/0206305 A1*  7/2015  Parakrama ............. G06V 20/56
                                                          382/172
2020/0139936 A1*  5/2020  Yamauchi ................ B60S 1/36
(Continued)

FOREIGN PATENT DOCUMENTS

JP     H0723675 U    *  5/1995
JP     2007307992 A  * 11/2007
(Continued)

*Primary Examiner* — Daniel M. Robert
(74) *Attorney, Agent, or Firm* — Dinsmore & Shohl LLP

(57) ABSTRACT

An electronic inner mirror device comprising a camera installed at a rear portion of a vehicle to acquire an image behind the vehicle, an electronic inner mirror that has two operation modes of an electronic mirror mode in which it displays the image and an optical mirror mode in which it reflects an area behind the vehicle, and a raindrop removing device that removes raindrops existing on a rear side of the vehicle with respect to the camera, and further comprises an electronic control unit that notifies an occupant or occupants that raindrops can be removed by the raindrop removing device when the operation modes are switched from the electronic mirror mode to the optical mirror mode in a situation where it is estimated that raindrops exist at a position other than the rear portion of the vehicle.

7 Claims, 5 Drawing Sheets

(51) Int. Cl.
*B60S 1/54* (2006.01)
*G02F 1/137* (2006.01)

(56) References Cited

U.S. PATENT DOCUMENTS

| | | | |
|---|---|---|---|
| 2021/0039670 A1* | 2/2021 | Sakai | B60W 50/14 |
| 2021/0051264 A1* | 2/2021 | Prabhakar | H04N 23/61 |
| 2021/0394774 A1* | 12/2021 | Zhang | B60W 60/0025 |
| 2021/0402962 A1* | 12/2021 | Li | G02B 27/0006 |
| 2022/0153235 A1* | 5/2022 | Sato | B60R 1/23 |
| 2022/0227333 A1* | 7/2022 | Matsunaga | G03B 17/02 |
| 2022/0327323 A1* | 10/2022 | Deshmukh | G06T 7/11 |
| 2023/0398935 A1* | 12/2023 | Kaneuchi | B60S 1/583 |

FOREIGN PATENT DOCUMENTS

| | | | |
|---|---|---|---|
| JP | 2010247654 A | * | 11/2010 |
| JP | 2020079025 A | * | 5/2020 |

* cited by examiner

ELECTRONIC INNER MIRROR DEVICE, NOTIFICATION CONTROL METHOD THEREFOR, AND NOTIFICATION CONTROL PROGRAM THEREFOR

CROSS-REFERENCE TO RELATED APPLICATION

This application claims priority to Japanese Patent Application No. JP2022-083328 filed on May 20, 2022, the content of which is hereby incorporated by reference in its entirety into this application.

BACKGROUND

1. Technical Field

The present disclosure relates to an electronic inner mirror device for a vehicle such as an automobile, a notification control method therefor, and a notification control program therefor.

2. Description of the Related Art

An electronic inner mirror device is known as one of devices for providing a driver with visual information behind a vehicle such as an automobile. The electronic inner mirror device includes an electronic inner mirror and a rear camera that is installed at a rear portion of a vehicle and acquires an image behind the vehicle. The electronic inner mirror has two operation modes of an electronic mirror mode in which it displays an image behind the vehicle and an optical mirror mode in which it reflects an area behind the vehicle by optical reflection, and is configured so that the operation modes can be switched by operating a switching device.

In a vehicle where a rear camera is installed inside the vehicle and photographs an area behind the vehicle through a rear window glass, when raindrops adhere to an outer surface of the rear window glass in an area on a rear side of the vehicle with respect to the rear camera, the rear camera cannot normally photograph the area behind the vehicle. For example, Japanese Patent Application Laid-open No. 2020-079025 describes an electronic inner mirror device configured to address this problem.

An electronic inner mirror device described in the above-mentioned Japanese Patent Application Laid-open publication includes a raindrop removing device and a rain sensor for a rear window glass. The raindrop removing device comprises a rear wiper configured to wipe an outer surface of the rear window glass including an area on a rear side of a vehicle with respect to a rear camera, or a cleaning liquid injection device configured to spray cleaning liquid onto the outer surface of the rear window glass including the area. The raindrop removing device operates when the rain sensor detects raindrops adhering to the outer surface of the rear window glass in the area on the rear side of the vehicle with respect to the rear camera.

According to the electronic inner mirror device described in the above-mentioned Japanese Patent Application Laid-open publication, raindrops adhering to the outer surface of the rear window glass in the area on the rear side of the vehicle with respect to the rear camera can be removed by the raindrop removing device. Therefore, it is possible to prevent the rear camera from being unable to normally photograph the area behind the vehicle due to raindrops, so that the electronic inner mirror can display the image behind the vehicle in the electronic mirror mode even in rainy weather.

However, a rain sensor is used for detecting raindrops adhering to the outer surface of the rear window glass in the area on the rear side of the vehicle with respect to the rear camera. Therefore, it is inevitable that the electronic inner mirror device becomes expensive.

In addition, in a vehicle that does not have a rain sensor for a rear window glass and a rear wiper is operated by operating a switch, the operation modes of an electronic mirror may be switched from the electronic mirror mode to the optical mode unnecessarily. That is, when the electronic mirror set to the electronic mirror mode cannot normally display an image behind the vehicle, a driver may not realize that raindrops can be removed by the rear wiper, and may perform the above switching of the operation modes of the electronic mirror without operating the rear wiper.

SUMMARY

The present disclosure provides an electronic inner mirror device, a notification control method therefor, and a notification control program therefor improved so as to reduce the possibility that operation modes are switched from an electronic mirror mode to an optical mode unnecessarily while avoiding the electronic inner mirror device from becoming expensive.

According to the present disclosure, an electronic inner mirror device is provided which comprises: a camera installed at a rear portion of a vehicle to acquire an image behind the vehicle; an electronic inner mirror that has two operation modes of an electronic mirror mode in which it displays the image and an optical mirror mode in which it reflects an area behind the vehicle by optical reflection, and is configured such that the operation modes can be switched by operating a switching device; and a raindrop removing device that is configured to remove raindrops existing on a rear side of the vehicle with respect to the camera.

The electronic inner mirror device further comprises an electronic control unit configured to notify an occupant or occupants that raindrops can be removed by the raindrop removing device when the operation modes are switched from the electronic mirror mode to the optical mirror mode in a situation where it is estimated that raindrops exist at a position other than the rear portion of the vehicle.

In addition, according to the present disclosure, a notification control method for an electronic inner mirror device is provided which comprises: a camera installed at a rear portion of a vehicle to acquire an image behind the vehicle; an electronic inner mirror that has two operation modes of an electronic mirror mode in which it displays the image and an optical mirror mode in which it reflects an area behind the vehicle by optical reflection, and is configured such that the operation modes can be switched by operating a switching device; and a raindrop removing device that is configured to remove raindrops existing on a rear side of the vehicle with respect to the camera.

The notification control method comprises a step of determining whether or not the operation modes have been switched from the electronic mirror mode to the optical mirror mode in a situation where it is estimated that raindrops exist at a position other than the rear portion of the vehicle, and a step of notifying an occupant or occupants that raindrops can be removed by the raindrop removing device when it is determined that the switching of the operation modes has been performed.

Further, according to the present disclosure, a notification control program for an electronic inner mirror device is provided which comprises; a camera installed at a rear portion of a vehicle to acquire an image behind the vehicle; an electronic inner mirror that has two operation modes of an electronic mirror mode in which it displays the image and an optical mirror mode in which it reflects the area behind the vehicle by optical reflection, and is configured such that the operation modes can be switched by operating a switching device; and a raindrop removing device that is configured to remove raindrops existing on a rear side of the vehicle with respect to the camera, and is executed by an electronic control device mounted on the vehicle.

The notification control program comprises a step of determining whether or not the operation modes have been switched from the electronic mirror mode to the optical mirror mode in a situation where it is estimated that raindrops exist at a position other than the rear portion of the vehicle, and a step of notifying an occupant or occupants that raindrops can be removed by the raindrop removing device when it is determined that the switching of the operation modes has been performed.

According to the above electronic inner mirror device, the notification control method and the notification control program, an occupant or occupants is notified that raindrops can be removed by the raindrop removing device when it is determined that the switching of the operation modes has been performed in a situation where it is estimated that raindrops exist at a position other than the rear portion of the vehicle Therefore, the occupant or occupants can recognize that raindrops can be removed by the raindrop removing device. Accordingly, even if raindrops subsequently adhere to the outer surface of the rear window glass in an area on the rear side of the vehicle with respect to the camera and the electronic mirror cannot normally display the image behind the vehicle, the occupant or occupants can remove raindrops by the raindrop removing device. As a result, it is possible to reduce a possibility that the operation modes of the electronic mirror are switched from the electronic mirror mode to the optical mode unnecessarily.

Therefore, for example, a rain sensor for detecting raindrops adhering to the outer surface of the window glass in the area on the rear side of the vehicle with respect to the rear camera is not required. As a result, the electronic inner mirror device can be made inexpensive as compared to where a rain sensor for detecting raindrops adhering to the outer surface of the rear window glass is provided.

In one aspect of the present disclosure, the electronic control unit is configured to estimate that raindrops exist at a position other than the rear portion of the vehicle when it is determined that front wipers are operating or when raindrops are detected by a rain sensor for the front wipers.

According to the above aspect, it is estimated that raindrops exist at a position other than the rear portion of the vehicle when it is determined that front wipers are operating or when raindrops are detected by a rain sensor for the front wipers. Therefore, in a situation where raindrops adhering to the outer surface of the rear window glass in an area on the rear side of the vehicle with respect to the camera, adhesion of raindrops can be estimated without requiring a rain sensor for detecting raindrops adhering to the outer surface of the rear window glass.

In another aspect of the present disclosure, the camera is installed at the rear portion of the vehicle in a vehicle compartment and is configured to acquire an image behind the vehicle through a rear window glass, and the raindrop removing device is a rear wiper that is configured to wipe an outer surface of the rear window glass including an area on the rear side of the vehicle with respect to the camera.

According to the above aspect, the raindrop removing device is a rear wiper that is configured to wipe an outer surface of the rear window glass, including an area on the rear side of the vehicle with respect to the camera. Therefore, by operating the rear wiper, raindrops adhering to the outer surface of the rear window glass including the area on the rear side of the vehicle with respect to the camera, can be wiped away.

Further, in another aspect of the present disclosure, the camera is installed at the rear portion of the vehicle in a vehicle compartment and is configured to acquire an image behind the vehicle through a rear window glass, and the raindrop removing device is a rear cleaning device configured to spray a cleaning liquid onto an outer surface of the rear window glass including an area on the rear side of the vehicle with respect to the camera.

According to the above aspect, the raindrop removing device is a rear cleaning device configured to spray a cleaning liquid onto an outer surface of the rear window glass including an area on the rear side of the vehicle with respect to the camera. Therefore, operating the rear cleaning device, raindrops adhering to the outer surface of the rear window glass including the area on the rear side of the vehicle with respect to the camera, can be removed by the cleaning liquid.

Further, in another aspect of the present disclosure, the camera is installed at the rear portion of the vehicle in a state of being exposed to an outside of the vehicle, and the raindrop removing device is a gas jet device that is configured to inject gas onto a lens of the camera.

According to the above aspect, the raindrop removing device is a gas jet device that is configured to inject gas onto a lens of the camera. Therefore, by operating the gas jet device, raindrops adhering to the lens of the camera can be removed by the jetted gas.

Other objects, other features and attendant advantages of the present disclosure will be readily understood from the description of the embodiments of the present disclosure described with reference to the following drawings.

DETAILED DESCRIPTION

An electronic inner mirror device, a notification control method therefor, and a notification control program therefor according to embodiments of the present disclosure will be described in detail below with reference to the accompanying drawings.

First Embodiment

Figure 1:
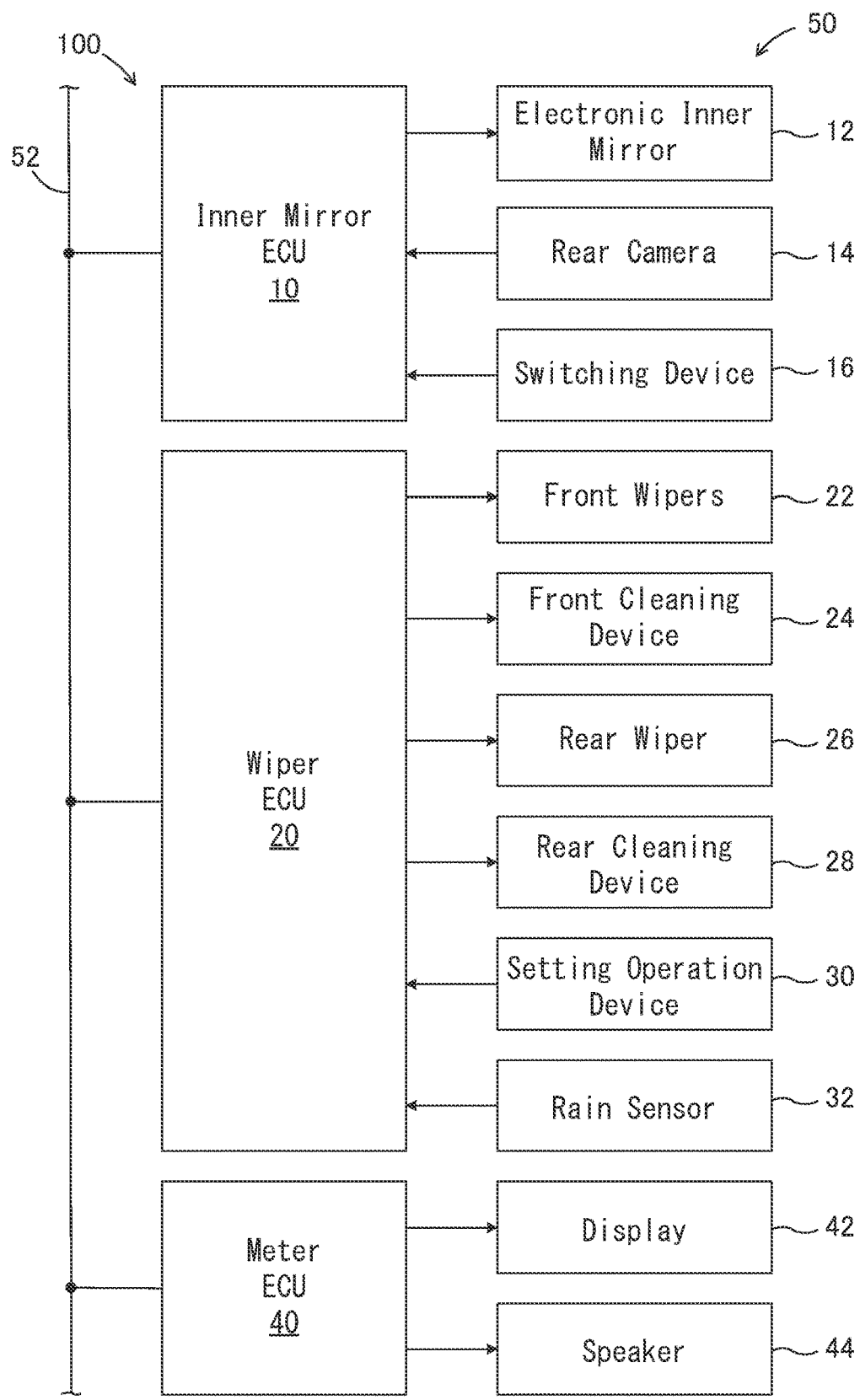
FIG. 1 is a diagram showing a vehicle equipped with an electronic inner mirror device according to a first embodiment of the present disclosure.

As shown in FIG. 1, the electronic inner mirror device 100 according to the first embodiment of the present disclosure is applied to a vehicle 50 and includes an inner mirror ECU 10. The vehicle 50 may be a vehicle capable of autonomous driving and has a wiper ECU 20 and a meter ECU 40. ECU means an electronic control unit having a microcomputer as its main part.

A microcomputer of each ECU includes a CPU, a ROM, a RAM, a readable and writable nonvolatile memory (N/M), an interface (I/F), and the like. The CPU implements various functions by executing instructions (programs, routines) stored in the ROM. Furthermore, these ECUs are connected to each other via a CAN (Controller Area Network) 52 so as to be able to exchange data (communicate). Therefore, detected values of sensors (including switches) connected to a specific ECU are transmitted to other ECUs as well.

The electronic inner mirror device 100 further includes an electronic inner mirror 12, a rear camera 14 and a switching device 16, which are connected to the inner mirror ECU 10. The inner mirror ECU 10 is an electronic control unit that controls operation modes of the electronic inner mirror 12. In the embodiment, the inner mirror ECU 10 also executes a notification control method by executing a notification control program for the electronic inner mirror 12 in cooperation with other ECUs, as will be described later in detail. The electronic inner mirror 12 is installed at an upper central part of a windshield glass (not shown) on an inside of a vehicle compartment, and provides a driver with visual information behind the vehicle 50.

Figure 2:
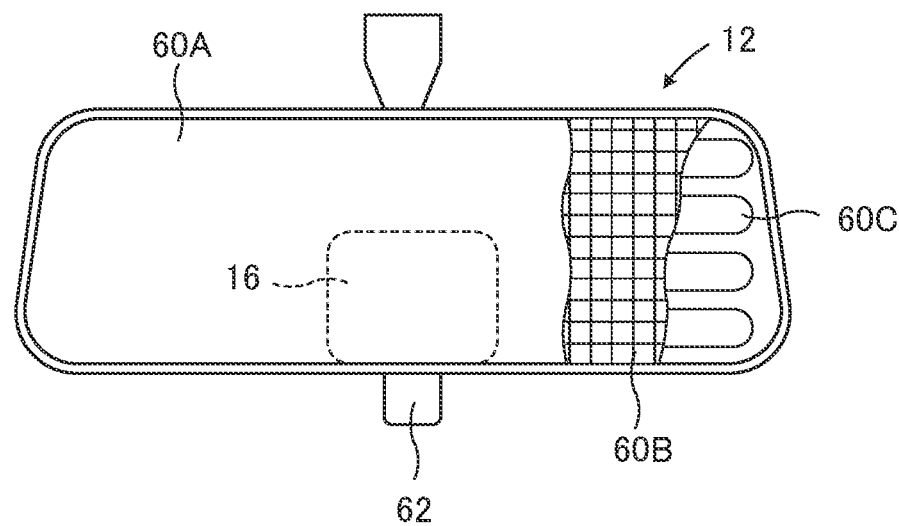
FIG. 2 is a partially cutaway view of an electronic inner mirror including a switching device for switching operation modes.

As shown in FIG. 2, the electronic inner mirror 12 includes a half mirror 60A arranged on a front surface, an image display device 60B such as an LCD (liquid crystal display) arranged on a back side of the half mirror, and a backlight 60C located behind the image display device. The switching device 16 incorporates a switch (not shown) for switching operation modes of the electronic inner mirror 12, and the switching device 16 switches between an electronic mirror position and an optical mirror position by operating an operation lever 62.

The backlight 60C is a light source that emits light when energized, such as an array of LEDs (light emitting diodes), a cold cathode tube, or the like. When the image display device 60B is an LCD, the backlight 60C is used, but when the image display device 60B is an organic EL (organic electro-luminescence), the organic EL itself contains a light source such as an LED, so that the backlight 60C is unnecessary.

In this embodiment, when the operation lever 62 is operated to set the switching device 16 to the electronic mirror position, the image display device 60B operates and the backlight 60C emits light by energization. Therefore, the electronic inner mirror 12 operates in an electronic mirror mode in which it displays an image captured by the rear camera 14.

On the other hand, when the switching device 16 is set to the optical mirror position by operating the operation lever 62, the image display device 60B does not operate and the backlight 60C does not emit light. Therefore, since the half mirror 60A acts as a reflecting mirror that reflects incident light, the electronic inner mirror 12 operates in an optical mirror mode in which it reflects the area behind the vehicle 50 by optical reflection.

Figure 3:
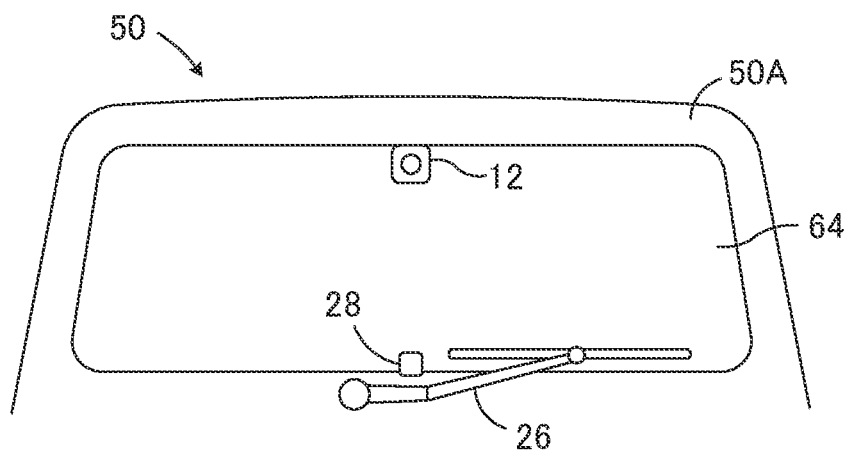
FIG. 3 is a view showing a rear camera installed at a rear portion of a vehicle and a rear wiper and a rear cleaning device functioning as raindrop removing devices.

The rear camera 12 is installed at a rear portion 50A of the vehicle 50. In the first embodiment, as shown in FIG. 3, the rear camera 12 is installed at an upper central part of a rear window glass 64 on the inside of a vehicle compartment. The rear camera 12 has a camera unit that captures an image behind the vehicle 50 through the rear window glass 64, and a processing unit that electrically processes information of the image behind the vehicle 50 acquired by the camera unit to generate an electric signal. The processing unit supplies the electric signal representing the image behind the vehicle 50 to the inner mirror ECU 10 at predetermined intervals.

Front wipers 22, a front cleaning device 24, a rear wiper 26, a rear cleaning device 28, a setting operation device 30 and a rain sensor 32 are connected to the wiper ECU 20. As is well known, the front wipers 22 includes, for example, two wipers and are configured to wipe an outer surface of the windshield glass (not shown). The wiper ECU 20 operates the front wipers 22 in a continuous mode, an intermittent mode, and an automatic mode according to an operation mode set by operating the setting operation device 30. A time interval of operation in the intermittent mode can also be variably set by the setting operation device. The front cleaning device 24 is also operated by operating the setting operation device 30, and as is well known, is configured to spray cleaning liquid onto the outer surface of the windshield glass.

When the rain sensor, which will be described later, detects raindrops in a situation where the operation mode is set to the automatic mode, the wiper ECU 20 controls the front wipers 22 automatically to operate so that the greater an amount of raindrops detected, the shorter the wiping interval. Furthermore, the wiper ECU 20 automatically terminates the operation of the front wipers 22 when the rain sensor no longer detects raindrops while the front wipers 22 are being automatically operated.

The rear wiper 26 is configured to wipe an outer surface of the rear window glass 64 including an area on the rear side of the vehicle with respect to the rear camera 12. The rear wiper 26 is also operated in a continuous mode and an intermittent mode by the wiper ECU 20 according to the operation mode set by operating the setting operation device 30. A time interval of operation in the intermittent mode can also be variably set by the setting operation device.

The rear cleaning device 28 is also operated by operating the setting operation device 30, and is configured to spray cleaning liquid onto the outer surface of the rear window glass 64 including the area on the rear side of the vehicle with respect to the rear camera 12. Therefore, the rear wiper 26 and the rear cleaning device 28 function as a raindrop removing device for the rear camera 12 that remove raindrops existing on the outer surface of the rear window glass 64 including the area on the rear side of the vehicle with respect to the rear camera 12.

The rain sensor 32 is arranged close to the electronic inner mirror 12 at the upper central part of the windshield glass on the inside of the vehicle compartment. The rain sensor 32 detects raindrops adhering to the outer surface of the windshield glass and functions as a rain sensor for the front wipers. For example, although not shown, the rain sensor 32 includes an LED as an irradiation element that emits infrared light toward the windshield glass and a photodiode as a light receiving element that receives reflected light from the windshield glass. When raindrops adhere to the outer surface of the windshield glass, an amount of reflected light incident on the photodiode decreases, so that the rain sensor 32 detects presence or absence of raindrops and an amount of raindrops based on the amount of reflected light.

The rain sensor 32 may be a front wiper rain sensor having any structure known in the art as long as it can detect raindrops existing at a position other than the rear portion of the vehicle 50.

The meter ECU 40 is connected to a display 42 that displays visual information to an occupant or occupants of the vehicle 50 and a speaker 44 that emits auditory information to the occupant or occupants of the vehicle 50. The display 42 may be, for example, a head-up display or a multi-information display displaying meters and various information, or may be a display of a navigation device. Speaker 44 may be, for example, a speaker of an audio device (not shown).

Figure 4:
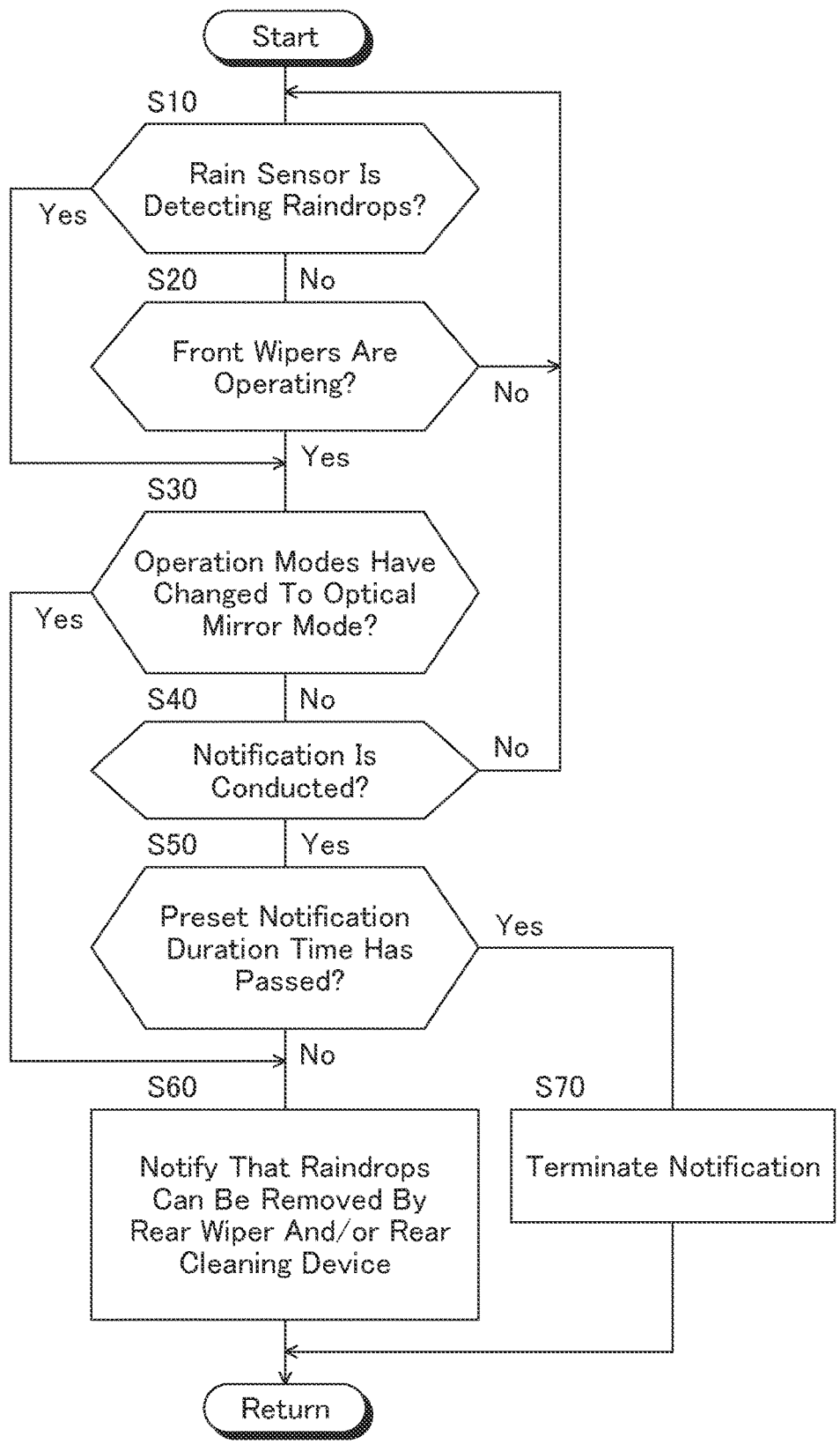
FIG. 4 is a flow chart showing a notification control program in the first embodiment.

The inner mirror ECU 10 executes notification control according to a notification control program shown in FIG. 4 as a flow chart. That is, the inner mirror ECU 10 determines whether or not the operation modes of the electronic inner mirror 12 have been switched from the electronic mirror mode to the optical mirror mode by operating the operation lever 62 of the switching device 16 in a situation where raindrops are detected by the rain sensor 32.

The inner mirror ECU 10, when it determines the above switching, notifies the occupant or occupants that raindrops existing in the area on the rear side of the vehicle with respect to the rear camera 12 can be removed by the rear wiper 26 and/or the rear cleaning device 28 functioning as a raindrop removing device for the rear camera by outputting a command signal to the meter ECU 40 and operating the display 42 and the speaker 44. Note that the notification may be, for example, an expression such as "Rear wiper and rear cleaning device can remove raindrops on the rear side of the rear camera."

Notification Control Program in First Embodiment

Next, the notification control program in the first embodiment will be described with reference to the flowchart shown in FIG. 4. Notification control according to the flowchart shown in FIG. 4 is executed by the CPU of the inner mirror ECU 10 when an ignition switch (not shown in FIG. 1) is on. Note that, in the first embodiment, the notification control method is executed by executing the notification control according to the flowchart shown in FIG. 4.

First, in step S10, the CPU determines whether or not the rain sensor 32 is detecting raindrops. When the CPU makes an affirmative determination, the present control proceeds to step S30, and when the CPU makes a negative determination, the present control proceeds to step S20.

In step S20, the CPU determines whether the front wipers 22 are operating. When the CPU makes a negative determination, that is, when it determines that the front wipers 22 are not operating, the present control once terminates, and when the CPU makes an affirmative determination, the present control proceeds to step S30.

Therefore, when it is determined in step S10 that the rain sensor 32 is detecting raindrops, or when it is determined in step S20 that the front wipers 22 are operating, it is estimated that raindrops exist at a position other than the rear portion of the vehicle, so that step S30 is executed. Note that when a negative determination is made in step S20 in a situation where a notification is made by step S60 which will be described later, the notification may be terminated.

In step S30, the CPU determines whether or not the operation modes of the electronic inner mirror 12 have changed from the electronic mirror mode to the optical mirror mode. When the CPU makes an affirmative determination, the present control proceeds to step S60, and when the CPU makes a negative determination, the present control proceeds to step S40.

In step S40, the CPU determines whether the notification by step S60 which will be described later, that is, the notification that raindrops existing in the area on the rear side of the vehicle with respect to the rear camera 12 can be removed by the rear wiper 26 and/or the rear cleaning device 28, is conducted. When the CPU makes a negative determination, the present control once terminates, and when the CPU makes an affirmative determination, the present control proceeds to step S50.

In step S50, the CPU determines whether or not a preset notification duration time has passed since the notification in step S60, which will be described later, is started. When the CPU makes an affirmative determination, the present control proceeds to step S70, and when it makes a negative determination, the present control proceeds to step S60.

In step S60, the CPU outputs a command signal to the meter ECU 40 to notify the occupant or occupants using the display 42 and the speaker 44 that raindrops existing in the area on the rear side of the vehicle with respect to the rear camera 12 can be removed by the rear wiper 26 and/or the rear cleaning device 28.

In step S70, the CPU terminates the notification performed by executing step S60. Therefore, it is possible to reduce the possibility that the occupant or occupants feels annoyed due to an unnecessarily long notification that raindrops existing in the area on the rear side of the vehicle with respect to the rear camera 12 can be removed by the rear wiper 26 and/or the rear cleaning device 28.

Second Embodiment

Figure 6:
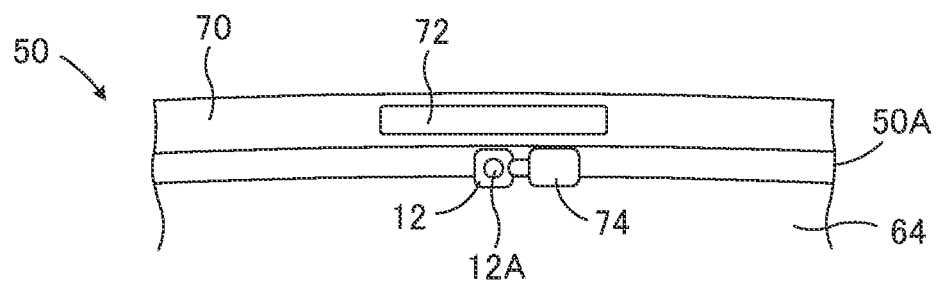
FIG. 6 shows a rear camera installed on an underside of a rear spoiler and an air jet device functioning as a raindrop removing device.

In the second embodiment of the electronic inner mirror device 100, as shown in FIG. 6, the rear camera 12 is installed in a state of being exposed to the outside of the vehicle below a rear spoiler 70 provided at the rear portion 50A of the vehicle 50. In FIG. 6, 64 denotes a rear window glass, and 72 denotes a center brake lamp provided on the rear spoiler 70.

An air jet device 74 functioning as a raindrop removing device is provided close to the rear camera 12 below the rear spoiler 70. Although not shown in FIG. 6, the air jet device 74 includes a small compressor that produces compressed air or a small air tank filled with compressed air.

Figure 5:
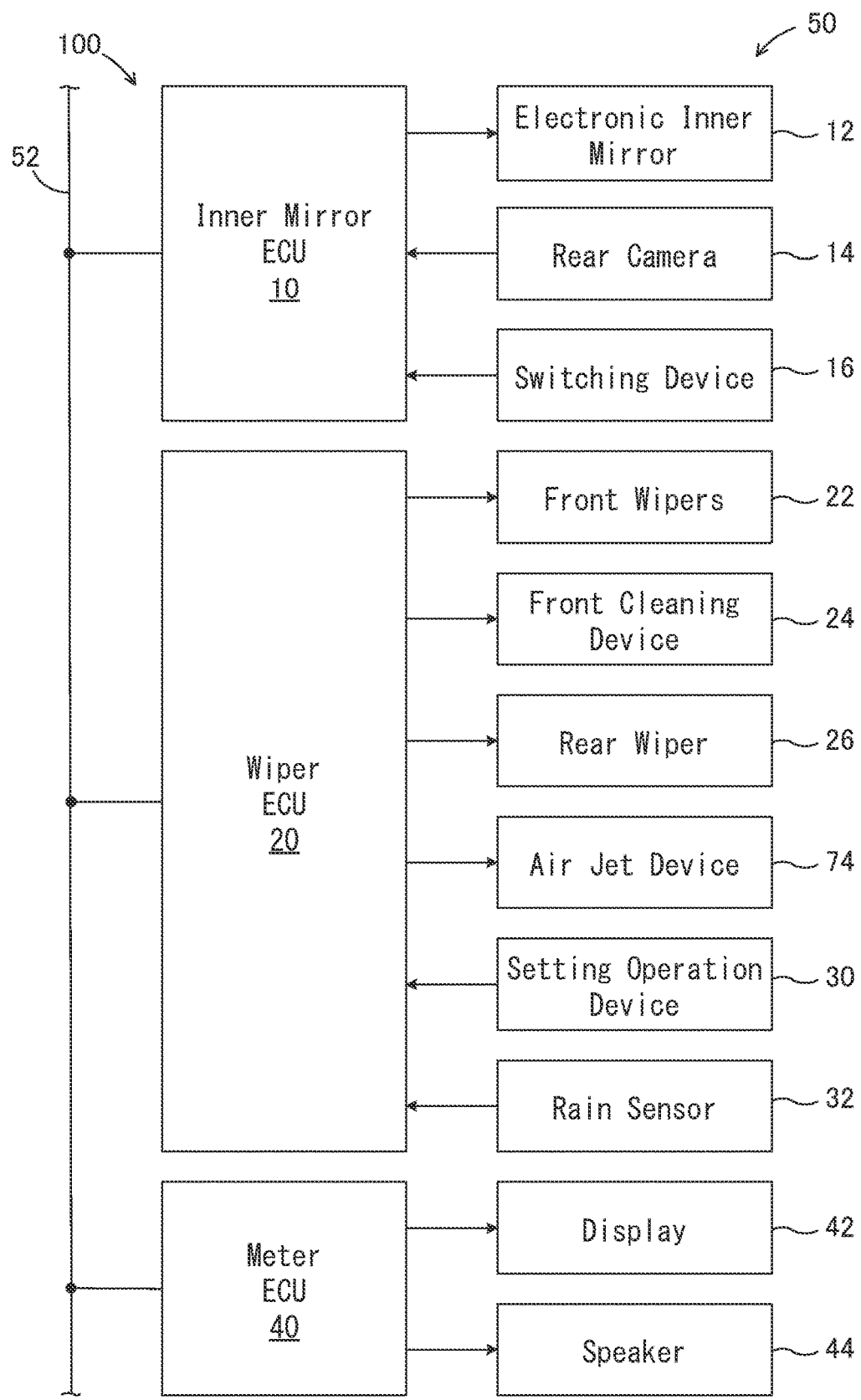
FIG. 5 is a diagram showing a vehicle equipped with an electronic inner mirror device according to a second embodiment of the present disclosure.

As shown in FIG. 5, the air jet device 74 is operated by the wiper ECU 20 when the setting operation device 30 is operated by an occupant to turn on the air jet device. When operated, the air jet device 74 ejects compressed air onto a lens 12A of the rear camera 12 to remove raindrops existing in the area on the rear side of the vehicle with respect to the rear camera 12, especially raindrops adhering to the lens 12A. Note that gas other than air may be injected.

Notification Control Program in Second Embodiment

Figure 7:
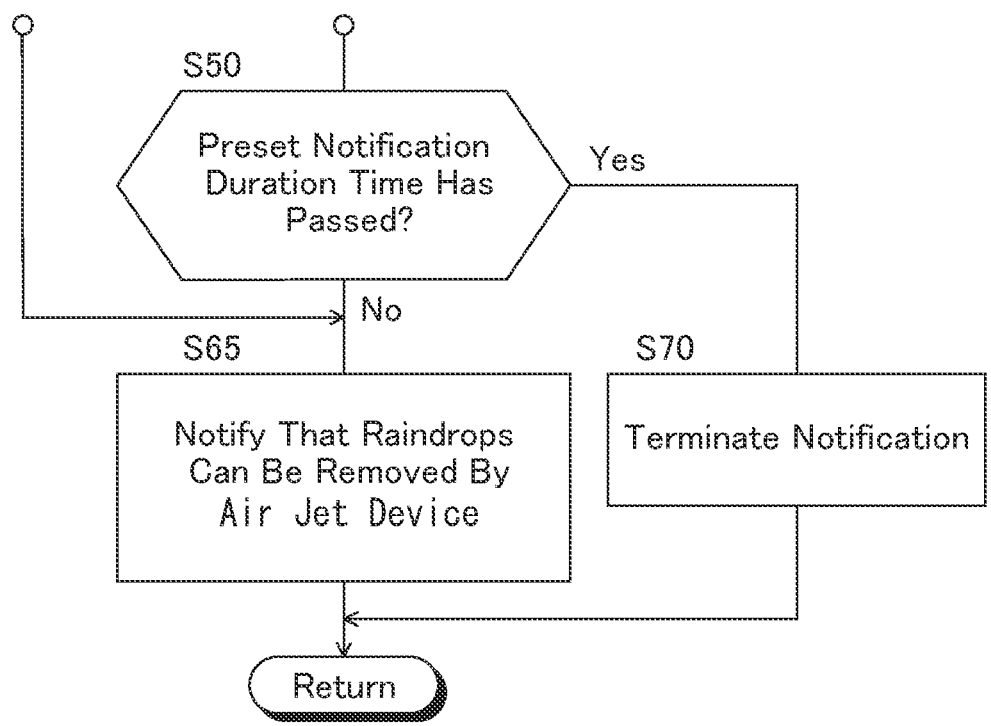
FIG. 7 is a flow chart showing a specific part of a notification control program in the second embodiment.

FIG. 7 is a flow chart showing a specific part of the notification control program in the second embodiment. Notification control according to the flowchart shown in FIG. 7 is also executed by the CPU of the inner mirror ECU 10 when the ignition switch (not shown in FIG. 5) is on. In the second embodiment, steps S10 to S50 and S70 are executed in the same manner as steps S10 to S50 and S70 in the first embodiment, respectively. Also, in the second embodiment, the notification control method is executed by executing the notification control according to the flowchart shown in FIG. 7.

In the second embodiment, when the CPU of the inner mirror ECU 10 makes an affirmative determination in step S50, the present control proceeds to step S70, and when the CPU makes a negative determination, the present control proceeds to step S65.

In step S65, the CPU outputs a command signal to the meter ECU to operate the display 42 and the speaker 44 to notify the occupant or occupants that raindrops existing in the area on the rear side of the rear camera 12 can be removed by the air jet device 74. Note that the notification may be, for example, an expression such as "Air jet device can remove raindrops on the rear side of the rear camera."

According to the first and second embodiments, when it is determined that the rain sensor 32 has detected raindrops (S10) or the front wipers 22 are operating (S20), it is determined whether or not the operation modes of the electronic inner mirror 12 have changed from the electronic mirror mode to the optical mirror mode (S30).

When it is determined that the operation modes have changed from the electronic mirror mode to the optical mirror mode, in the first embodiment, the occupant or occupants is notified that raindrops existing in the area on the rear side of the vehicle with respect to the rear camera 12 can be removed by the rear wiper 26 and/or the rear cleaning device 28 for a preset notification duration time (S40-S70). In the second embodiment, the occupant or occupants is notified that raindrops existing in the area on the rear side of the vehicle with respect to the rear camera 12 can be removed by the air jet device 74 for a preset notification duration time (S40, S50, S65, S70).

Therefore, the occupant or occupants can recognize that raindrops can be removed by the raindrop removing device such as the rear wiper 26. Accordingly, even if raindrops subsequently adhere to the outer surface of the rear window glass 64 in the area on the rear side of the vehicle 50 with respect to the rear camera 12 and the electronic mirror 12 cannot normally display the image behind the vehicle, the occupant or occupants can remove raindrops by the raindrop removing device. As a result, it is possible to reduce the possibility that the operation modes of the electronic mirror are switched from the electronic mirror mode to the optical mode unnecessarily.

Further, when raindrops adhere to the outer surface of the rear window glass 64 in the area on the rear side of the vehicle with respect to the rear camera 12, adhesion of raindrops can be estimated without requiring a rain sensor for detecting raindrops adhering to the outer surface of the rear window glass. Therefore, for example, a rain sensor for detecting raindrops adhering to the outer surface of the rear window glass in the area on the rear side of the vehicle with respect to the rear camera 12 is not required. As a result, the electronic inner mirror device 100 can be made inexpensive as compared to where a rain sensor for detecting raindrops adhering to the outer surface of the rear window glass is provided.

In particular, according to the first embodiment, the raindrop removing device includes the rear wiper 26 configured to wipe the outer surface of the rear window glass including the area on the rear side of the vehicle with respect to the rear camera 12, and the rear cleaning device 28 configured to spray cleaning liquid onto the outer surface of the rear window glass including the area on the rear side of the vehicle relative to the rear camera. Therefore, by operating the rear wiper and/or the rear cleaning device, it is possible to remove raindrops adhering to the outer surface of the rear window glass including the area on the rear side of the vehicle with respect to the rear camera.

According to the second embodiment, the raindrop removing device is an air jet device 74 configured to inject gas onto the lens 12A of the rear camera 12. Therefore, by operating the air jet device, raindrops adhering to the lens of the rear camera can be removed by the jetted compressed air.

Although the present disclosure has been described in detail with reference to a specific embodiment, it will be apparent to those skilled in the art that the present disclosure is not limited to the above-described embodiment, and various other embodiments are possible within the scope of the present disclosure.

For example, in the above-described embodiments, the display 42 and speaker 44 are used to provide visual and auditory information to the occupant or occupants that raindrops existing in the area on the rear side of the vehicle with respect to the rear camera 12 can be removed by the raindrop removing device, such as the rear wiper 26. However, the notification that raindrops can be removed may be made by only one of visual information and auditory information. The first notification that raindrops can be removed may be provided by visual information, and the second notification may be provided by auditory information. Further, the first notification that raindrops can be removed may be provided by one of the visual information and the auditory information, and the second notification may be provided by both the visual information and the auditory information.

Further, in the above-described embodiments, a notification that raindrops can be removed is made in steps S50 to S70 for a preset notification duration time. However, even if the preset notification duration time has not elapsed since the notification was started, the notification may be canceled by the switch operation by an occupant.

Further, in the above-described embodiments, when it is determined that the rain sensor 32 is detecting raindrops or when it is determined that the front wipers 22 are operating, it is estimated that raindrops exist at a position other than the rear portion of the vehicle, and step S30 is executed. However, especially in a situation where the operation mode of the front wipers 22 is set to the automatic mode, when it is determined that the rain sensor 32 has detected raindrops and the front wipers 22 are operating, it may be estimated that raindrops exist at a position other than the rear portion of the vehicle, and step S30 may be executed.

Furthermore, in the first embodiment described above, the rear wiper 26 and the rear cleaning device 28 function as a raindrop removing device for the rear camera. However, one of the rear wiper 26 and the rear cleaning device 28 may be omitted.

What is claimed is:
1. An electronic inner mirror device which comprises:
   a camera installed at a rear portion of a vehicle to acquire an image behind the vehicle;
   an electronic inner mirror that has two operation modes of an electronic mirror mode in which it displays the image and an optical mirror mode in which it reflects an area behind the vehicle by optical reflection, and is configured such that the operation modes can be switched by operating a switching device; and a raindrop removing device that is configured to remove raindrops existing on a rear side of the vehicle with respect to the camera, wherein the electronic inner mirror device further comprises an electronic control unit configured to notify an occupant or occupants that raindrops can be removed by the raindrop removing device when the operation modes are switched from the electronic mirror mode to the optical mirror mode in a situation where it is estimated that raindrops exist at a position other than the rear portion of the vehicle.

2. The electronic inner mirror device according to claim 1, wherein the electronic control unit is configured to estimate that raindrops exist at a position other than the rear portion of the vehicle when it is determined that front wipers are operating or when raindrops are detected by a rain sensor for the front wipers.

3. The electronic inner mirror device according to claim 1, wherein the camera is installed at the rear portion of the vehicle in a vehicle compartment and is configured to acquire an image behind the vehicle through a rear window glass, and the raindrop removing device is a rear wiper that is configured to wipe an outer surface of the rear window glass including an area on the rear side of the vehicle with respect to the camera.

4. The electronic inner mirror device according to claim 1, wherein the camera is installed at the rear portion of the vehicle in a vehicle compartment and is configured to acquire an image behind the vehicle through a rear window glass, and the raindrop removing device is a rear cleaning device configured to spray a cleaning liquid onto an outer surface of the rear window glass including an area on the rear side of the vehicle with respect to the camera.

5. The electronic inner mirror device according to claim 1, wherein the camera is installed at the rear portion of the vehicle in a state of being exposed to an outside of the vehicle, and the raindrop removing device is a gas jet device that is configured to inject gas onto a lens of the camera.

6. A notification control method for an electronic inner mirror device which comprises: a camera installed at a rear portion of a vehicle to acquire an image behind the vehicle; an electronic inner mirror that has two operation modes of an electronic mirror mode in which it displays the image and an optical mirror mode in which it reflects an area behind the vehicle by optical reflection, and is configured such that the operation modes can be switched by operating a switching device; and a raindrop removing device that is configured to remove raindrops existing on a rear side of the vehicle with respect to the camera, wherein the notification control method comprises a step of determining whether or not the operation modes have been switched from the electronic mirror mode to the optical mirror mode in a situation where it is estimated that raindrops exist at a position other than the rear portion of the vehicle, and a step of notifying an occupant or occupants that raindrops can be removed by the raindrop removing device when it is determined that the switching of the operation modes has been performed.

7. A notification control program for an electronic inner mirror device which comprises: a camera installed at a rear portion of a vehicle to acquire an image behind the vehicle; an electronic inner mirror that has two operation modes of an electronic mirror mode in which it displays the image and an optical mirror mode in which it reflects an area behind the vehicle by optical reflection, and is configured such that the operation modes can be switched by operating a switching device; and a raindrop removing device that is configured to remove raindrops existing on a rear side of the vehicle with respect to the camera, and is executed by an electronic control device mounted on the vehicle, wherein the notification control program comprises a step of determining whether or not the operation modes have been switched from the electronic mirror mode to the optical mirror mode in a situation where it is estimated that raindrops exist at a position other than the rear portion of the vehicle, and a step of notifying an occupant or occupants that raindrops can be removed by the raindrop removing device when it is determined that the switching of the operation modes has been performed.

\* \* \* \* \*